April 10, 1962 J H. LOCHER 3,028,923
APPARATUS FOR WEIGHING RAILROAD CARS
Filed Feb. 6, 1958 4 Sheets-Sheet 1
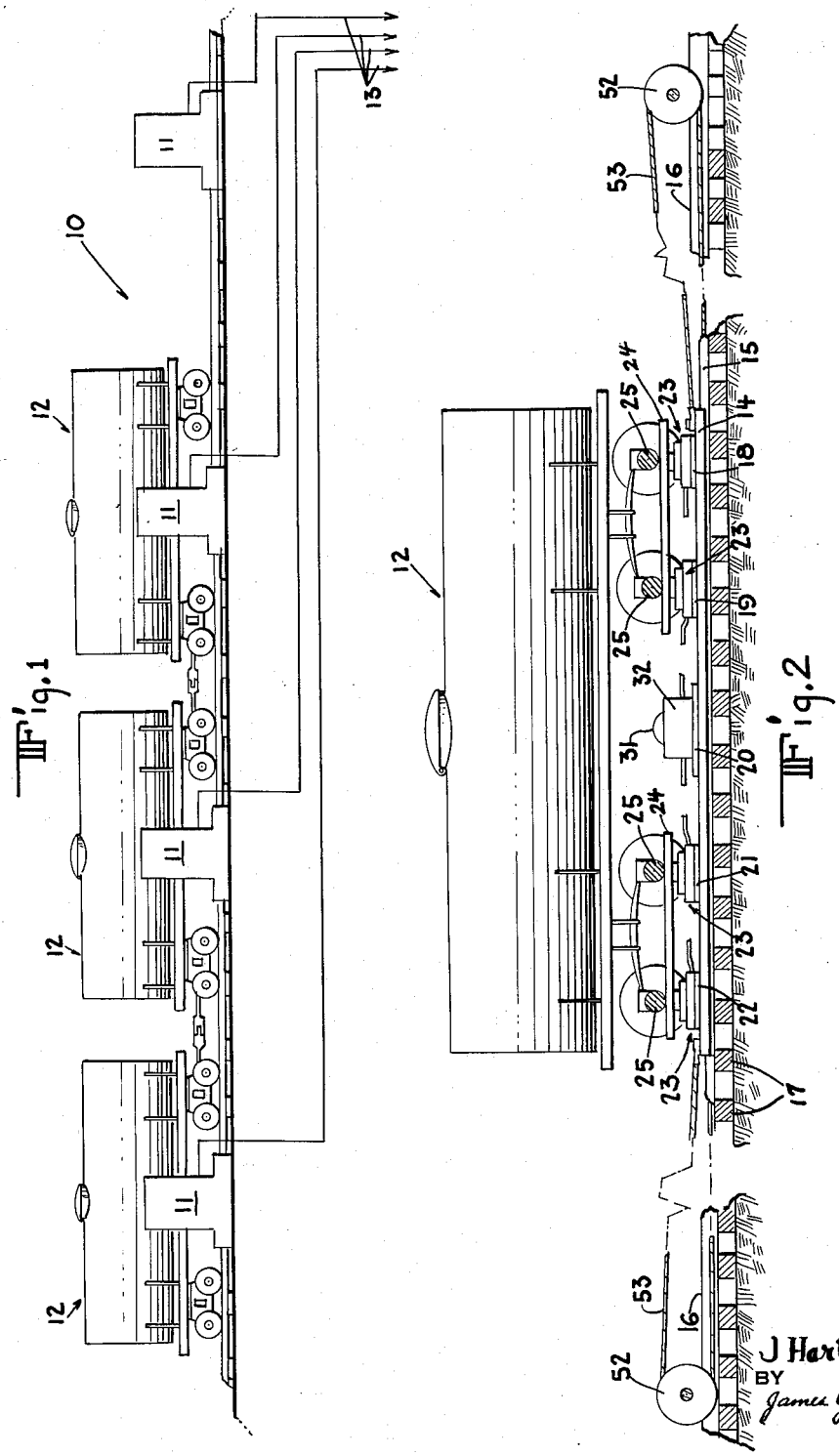
INVENTOR
J Hartley Locher
BY
James Y. Cleveland
ATTORNEY April 10, 1962 J H. LOCHER 3,028,923
APPARATUS FOR WEIGHING RAILROAD CARS
Filed Feb. 6, 1958 4 Sheets-Sheet 2
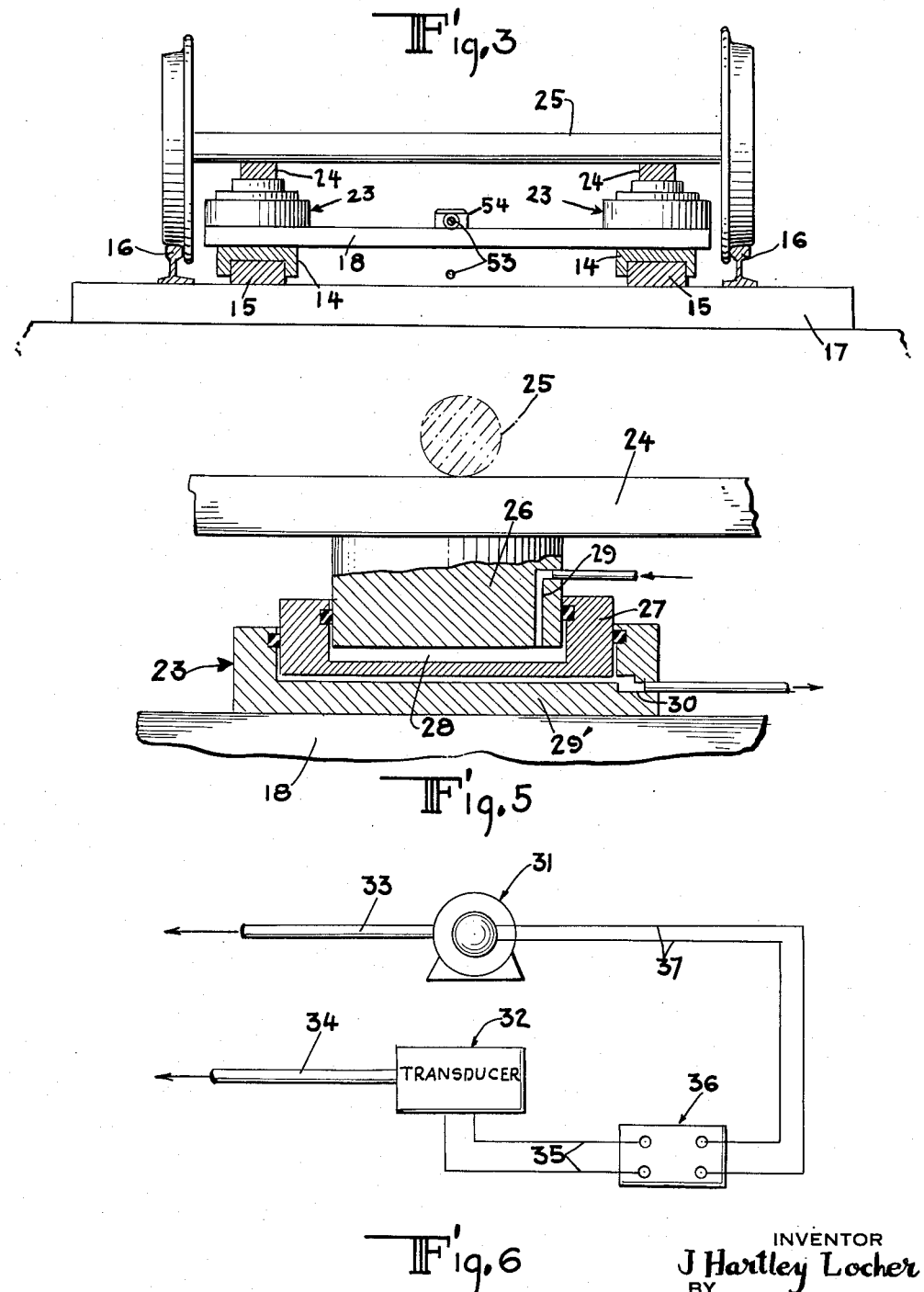
INVENTOR
J Hartley Locher
BY
James Y. Cleveland,
ATTORNEY April 10, 1962 J H. LOCHER 3,028,923
APPARATUS FOR WEIGHING RAILROAD CARS
Filed Feb. 6, 1958 4 Sheets-Sheet 3

INVENTOR
J Hartley Locher
BY
James Y. Cleveland
ATTORNEY

United States Patent Office 3,028,923
Patented Apr. 10, 1962

3,028,923
APPARATUS FOR WEIGHING RAILROAD CARS
J Hartley Locher, Norwalk, Conn., assignor to Socony Mobil Oil Company, Inc., a corporation of New York
Filed Feb. 6, 1958, Ser. No. 713,662
4 Claims. (Cl. 177—132)

This invention relates to an apparatus for weighing railroad cars and, more particularly, to an apparatus adapted for use in weighing railroad cars that are in loading position on a loading-rack siding.

Heretofore, it has been the practice in loading railroad cars, such as tank cars, coal cars, etc., to employ a switch engine to move the empty cars individually and successively onto a loading scale that is fixed and constructed in a manner such that it becomes a portion of the loading siding. After the empty cars have been weighed, then the string of cars is moved into position adjacent individual loading points where the cars are filled with the desired product. The loaded cars are then moved, by means of a switch engine, individually and separately onto the loading scale where they are again weighed to determine the weight of the contents of each car. This is a time consuming operation which may be very expensive, considered from the point of view of equipment, man and car hours employed.

In loading some oil products, such as asphalt, considerable foaming occurs. This makes conventional gauging means, such as by use of the simple ullage or tollage rods, inaccurate for determining the true liquid contents of the car. Therefore, prior art methods give the loader no accurate control over the contents of the car while it is positioned by or under the loading-rack.

Foaming while loading has produced numerous complaints by buyers of asphalt because, on receipt of a car load, the foam has had time to subside and gauging the contents of the car would show that they had received short measure. A further cause for customer complaint arises from the fact that he is unable to remove the entire contents of the car due to "clingage," i.e., asphalt clinging to the wall and bottom of the car. This, in some instances, can amount to as much as one-half to one percent of the total contents of the car, depending upon the temperature of the asphalt being removed from the car. Thus, it can be seen that this will amount to a sizable loss to the customer who buys substantial quantities of asphalt.

The present invention provides an apparatus for overcoming the above enumerated objectionable features in that it permits spotting a series of cars on a loading-rack siding in position to be loaded with the desired product. The switch engine can then depart and each car weighed in any desired selected order; filled to capacity with the desired product; and reweighed to determine the net contents of each car without moving any of the cars of the string from the position where they had been initially spotted. This is accomplished by use of weighing means which can be moved along the bed of the loading-rack siding until it is under the car that is being weighed. When in position under the car, the weighing means can be operated to lift the car free of the tracks and maintain it in elevated position while weighing. Since the weighing device can be moved from one car to another, at the will of the operator, the loading of a selected car can be accurately controlled by observing the increase in weight during the loading operation. As soon as one car has been loaded to the desired capacity, without moving any cars along the siding, the weighing means can be moved along the siding bed to a position under the next car to be loaded and the operation repeated. This novel invention enables a loader to accurately load a string of cars positioned on the same siding adjacent a loading-rack without moving any of the cars along the siding during the loading operation. The instant invention, in addition to replacing the conventional gauging and temperature measurement of asphalt, which is inaccurate and very difficult to perform, will allow direct charges and billings based upon the weight of the product and allow local, direct and automatic recording and billing procedure. Furthermore, it is faster, more accurate and less costly than similar measurements made with conventional weighing equipment. An added advantageous application is in its use as an operational aid by refinery personnel.

Therefore, the primary object of this invention resides in the provision of an apparatus for successively and individually weighing a string of railroad cars positioned on a loading-rack siding to a controlled capacity without moving any of the cars along the siding until all of them have been loaded. Another object of this invention is to provide a novel weighing device which, when operated, will lift a railroad car free of the rails to determine its weight and/or its net contents. Still another object of this invention resides in the provision of a novel weighing device capable of being moved along the bed of a loading-rack siding into weighing position under any selected car without moving any of the string of cars positioned on the siding. This invention also contemplates a novel arrangement of elements in the form of a portable weighing device, portable in the sense of the word that it can be moved along the bed of a railroad siding, for individually weighing selected cars that are in a string of stationary cars. This invention further contemplates a weighing device mounted upon skids which may, by means of one or more remotely located winches, be skidded into position for weighing any one of a string of stationary cars located on the same track. Still another object of the present invention is to provide a skid mounted weighing device which, when not in use, will be sufficiently low that any of the standard railroad equipment will clear the device when moving along the tracks. Other objects and advantages of the present invention will become apparent from the following detailed description when taken with the drawings in which:

FIGURE 1 shows in vertical elevation a longitudinal fragment of a railroad track, which may be a siding, with a string of railroad cars positioned thereon adjacent loading stations;

FIGURE 2 is a vertical elevational view of a single car supported by the novel weighing means of the instant invention and showing a fragment of the railroad track and car trucks in vertical section;

FIGURE 3 is an end view of a section of railroad track showing the weighing device, a pair of car wheels and their connecting axle in vertical elevation;

FIGURE 5 is a fragmentary, vertical, sectional view of a portion of the weighing device showing the manner of operation of a load cell to lift a truck axle of the car;

FIGURE 6 is a schematic wiring diagram for supplying power to equipment carried by the skid and telemetering circuits for transmitting the weighing data to a remote indicator.

Figure 4:
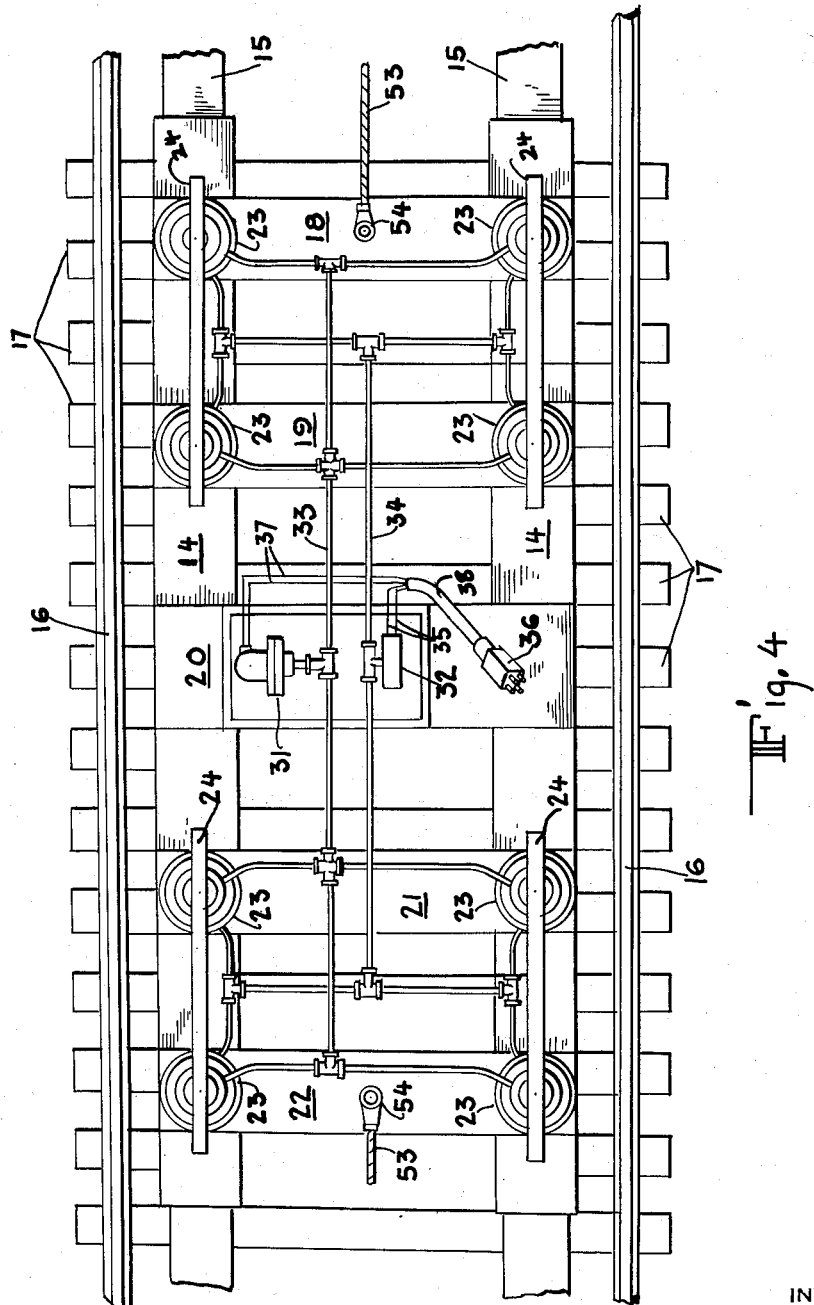
FIGURE 4 is a plan view of the weighing device shown disposed upon its skid rails which are mounted on the ties of the railroad bed.

Referring to the drawings in detail, in FIGURE 1 there is shown a fragment of a railroad siding 10 which is located adjacent weighing stations 11. There is shown on the siding, adjacent three of the weighing stations 11, a string of three tank cars 12. These cars may be located abreast of a loading rack that is adapted to accommodate a plurality of cars. The novel weighing device to be described later is not shown in this figure. However, conduits 13 for carrying the power supply circuits, signal transmitting circuits, and winch control circuits are schematically shown by single line diagram.

The novel skid mounted weighing device contemplated by the present invention is shown in FIGURES 2, 3 and 4. It comprises a pair of skid elements 14 that are adapted to move on and longitudinally of skid plates or rails 15 that are disposed inside of the rails 16 of the siding but rest upon the cross ties 17. Skid plates 15 extend the entire length of the loading-rack siding. The flanged elements forming skids 14 are adapted to slide on these plates. Elements 14 are connected together by transverse structural elements 18, 19, 20, 21 and 22. Combination jacking and weighing cells 23 are mounted on opposite ends of the transverse structural elements 18, 19, 21 and 22, respectively. As shown in FIGURES 2 and 4, these load cells are spanned in pairs by live platforms 24. The live platforms 24 are adapted to be raised by the cells 23 to contact opposite ends of the truck axles 25 of a tank car 12 that is to be raised and weighed.

The construction of each of the jacking and weighing cells 23 is illustrated in FIGURE 5 of the drawings. It comprises a hydraulic jack section consisting of the piston 26 and its cylinder defining means 27. The piston, although in sliding engagement with its cylinder, forms a fluid tight seal therewith. The end of the cylinder defines with the bottom end of the piston 26 a fluid chamber 28. A communicating passageway 29 is formed in the piston element and communicates with a hydraulic pumping system, not shown in this view. The cylinder defining means 27 serves a dual function in that it is also a piston for an independent fluid system. The bottom of the latter piston forms with cylinder defining means 29' a fluid chamber having a communicating passageway 30 extending outside of the cylinder defining means 29' to a transducer that will convert pressure to an electrical signal that can be transmitted to a remotely located indicating device which is calibrated in terms of weight.

Figure 7:
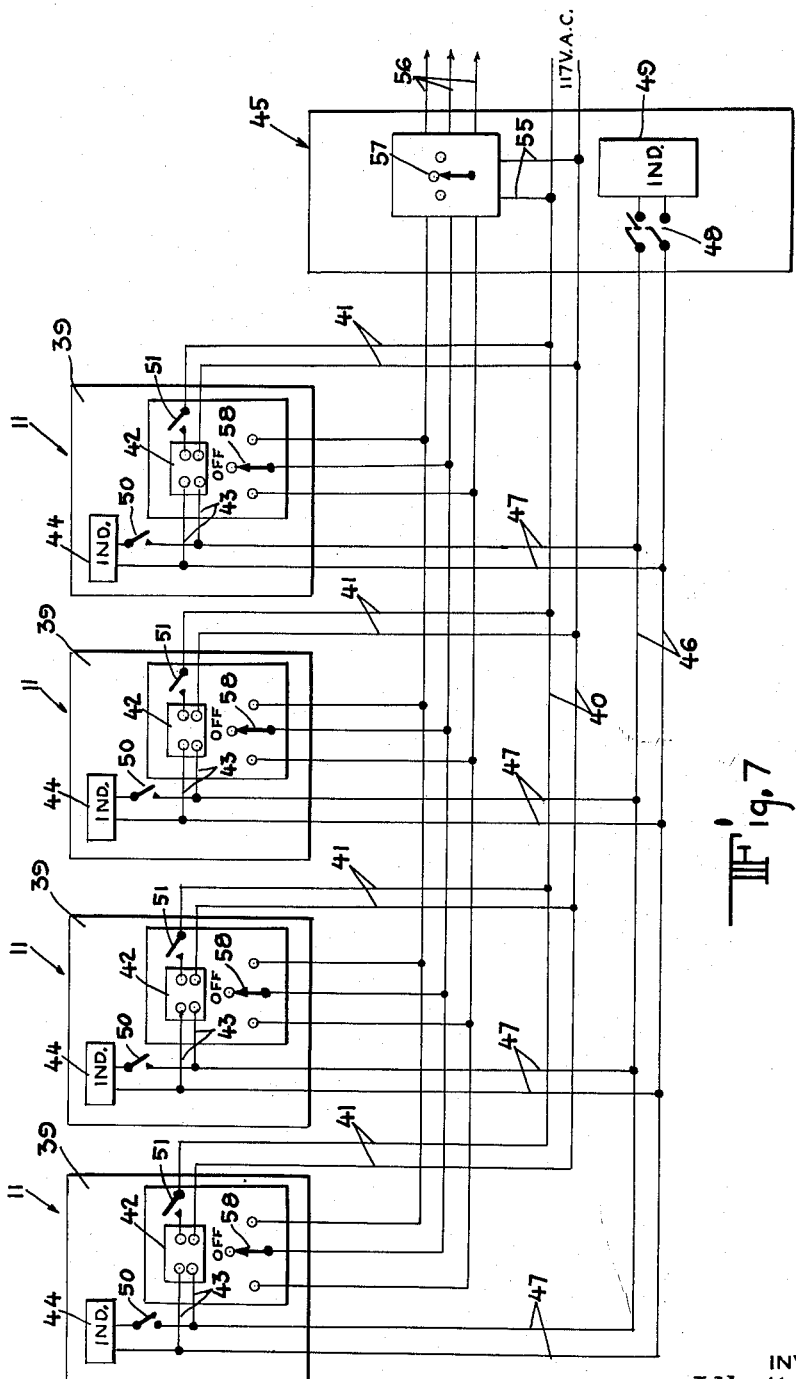
FIGURE 7 is a schematic wiring diagram of the control and power circuits carried by the conduits 13 to each of the weighing stations.

As shown schematically in FIGURES 2 and 4, conventional hydraulic equipment 31 and transducer means 32 are carried by the transverse structural element 20 of the weighing unit. Hydraulic pressure conduits 33 communicate with the passageways 29 of each of the jacking units forming a part of the load cells 23. Additional pressure conduits 34 extend from the passageways 30 in the cells 23 to the transducer means 32. When the weighing device is in the position shown in FIGURE 2 under the tank car, hydraulic fluid under pressure is supplied by the conduits 33 to the jack portion of the cells 23 to raise their pistons 26. The live platforms 24, carried by the pistons, are brought into contact with the wheel axles 25 of the car. The application of additional pressure to the hydraulic fluid will cause the jacks to lift the trucks and the car high enough to free the wheels from the rails. When the car is lifted free of the rails, the entire weight of the car exerts pressure on the fluid in the chamber defined by the piston 27 and cylinder defining means 29'. The pressure of this fluid is communicated by the passageway 30 and the conduits 34 to the transducer 32 where it is converted into an electrical signal. The electrical signal is conducted from the transducer 32 by conductors 35, which lead to a connector plug 36. Power for the operation of the hydraulic jacking means is supplied by conductors 37. Conductors 37 also lead to the connector plug 36. Conductors 35 and 37 may be enclosed in a common sheath to form the cable 38. When the skid mounted weighing device has been positioned under a car that has been spotted at a weighing station, the connector plug end of cable 38 is brought out and plugged into trackside facilities located at each weighing station. The trackside facilities are illustrated in FIGURE 7 by a schematic electrical wiring diagram.

At each weighing station 11 there is provided a control and indicating panel 39. Power for the operation of the hydraulic jacking means is supplied from a conventional 117 volt A.C. source by conductors 40. Conductors 40 are provided with laterals 41 which lead to the respective control panels 39. Each pair of lateral conductors 41 terminates at a connector 42 that is adapted to receive the connecting plug 36, described above. Connector 42 is also provided with telemetering conductors 43 by means of which the transducer produced electrical signals are conducted to indicating means 44 also carried by the panel 39. Provision is also made for transmitting these transducer produced signals to a remotely located indicating station 45. The transducer produced signals may be conducted by the conductors 46 to the remotely located station 45. As shown in the drawings, conductors 46 are provided with laterals 47 which are connected in parallel with the conductors leading to the local indicating means 44. Conductors 46 are provided with a double pole, single throw switch 48 by means of which the remotely located indicating means 49 can be rendered inoperative when it is desired to use the indicators carried by the panels 39. Additionally, when the remotely located indicator 49 is being used, the indicators carried by panel 39 can be rendered inoperative by opening the switches 50. Switches 51, located in the power supply laterals, are provided so that the power supply to the hydraulic jack operating motor can be controlled.

As pointed out above, the skid on which the weighing elements are mounted is adapted to be moved along the bed of the siding on the skid rails 15. As shown in FIGURE 2, this is accomplished by means of winches 52, located at or near opposite ends of the siding. These winches are connected by cable 53 to the ends of the skid structure as at 54. Either one of the winches 52 may be operated by a reversible motor, not shown, to move the skid along the siding bed to position it under the selected car that is to be weighed. Power for the operation of the motor, which drives the winches, is supplied by conductors 55 and 56. This power may be optionally controlled by a reversing switch 57, located at the remote station 45, or by one of the switches 58, carried by panels 39.

In operation, one or more cars are spotted on a siding adjacent a loading rack in the manner illustrated in FIGURE 1. Winch 52 is then operated in the proper direction to move the skid mounted weighing device into position under the car. The hydraulic jacking means are then energized to raise the car free of the rails. Pressure thereby applied to the secondary fluid system will cause the transducer to produce proportionally related electrical signals. These signals may be read on the indicator located at that particular weighing station, or the signals may be transmitted to a remote station where they can be indicated, recorded, made to operate a ticket printer, tape punch-out or other device.

The skid mounted weighing device is so constructed that when the live platforms 24 are lowered by the jacking cells 23, any standard railroad equipment that moves along the track will clear the device. This allows the weighing device to remain on the skid rails when not in use.

It is obvious from the foregoing description of the weighing device that it can be used in car loading operations where an accurate net content is desired. Although the instant invention has been described in detail in connection with the weighing of tank cars, it is obvious to those skilled in the art that it finds equal application in weighing other types of cars.

I claim:

1. A railroad car weighing device that is adapted to selectively weigh any one of a plurality of cars that have been spotted on a siding without moving them from their spotted position that comprises in combination a pair of parallel skid rails disposed between but parallel to the siding rails and extending for a substantial length of the siding, a skid adapted to slide on the skid rails, winch and cable means for moving the skid along the skid rails, hydraulic means carried by the skid for lifting the car trucks free of the siding rails, means for operating said hydraulic means, a pair of conductors for supplying power to said operating means, fluid pressure means for sensing the weight of the car while in lifted position, a transducer responsive to the fluid pressure means for converting pressures into electrical signals, a pair of conductors extending from said transducer, a plurality of weighing stations located adjacent said siding and spaced from each other along the siding at car length intervals, winch control, weight indicating, and power means at each of said stations, means for selectively and detachably connecting the transducer conductors and hydraulic operating means conductors to the weight indicating means and the power supply means, respectively, optionally operative winch control and weight indicating means located at a remote point, and telemetering means for connecting the facilities at each of the weighing stations with the facilities at the remote point.

2. A railroad car weighing device that is adapted to selectively weigh any one of a plurality of cars that have been spotted upon a siding without moving them from their spotted position that comprises: a pair of parallel skid rails disposed between but parallel to the siding rails and extending for a substantial length of the siding, a skid carried by and adapted to move along the skid rails, means for moving the skid along the skid rails, upon said skid two spaced hydraulic lift means and cradles carried thereby for simultaneously engaging both trucks of the car and lifting the car free of the siding rails, in each hydraulic lift a fluid pressure weight sensing means, a common fluid medium supply means for said weight sensing means, in said fluid medium supply means a transducer for converting pressures into proportional electrical signals, a pair of conductors extending from said transducer, a plurality of weighing stations spaced at car length intervals along said siding, at each weighing station power supply means, weight indicating means and skid positioning means, and means for selectively and detachably connecting the transducer conductors and hydraulic lift means power conductors to the weight indicating means and the power supply means respectively.

3. A railroad car weighing device that is adapted to selectively weigh any one of a plurality of cars that have been spotted upon a siding without moving them from their spotted position that comprises: a pair of parallel skid rails disposed upon the ties of the railroad siding and between but parallel to the siding rails and extending for a substantial length of the siding, a skid adapted to slide on the skid rails, means for moving the skid along the skid rails, upon said skid two spaced hydraulic lift means and cradles carried thereby for engaging the trucks of the car and simultaneously lifting the car free of the siding rails, in each hydraulic lift a fluid pressure sensing means, a common fluid supply means for said weight sensing means, in said fluid supply means a transducer for converting pressures into proportional electrical signals, and means for measuring said electrical signals as an index of the weight of the car.

4. A railroad car weighing device that is adapted to selectively weigh any one of a plurality of cars that have been spotted upon a siding without moving them from their spotted position that comprises: a pair of parallel skid rails disposed upon the ties of the railroad siding and between but parallel to the siding rails and extending for a substantial length of the siding, a skid adapted to slide on the skid rails, means for moving the skid along the skid rails, upon said skid hydraulic lift means and on said hydraulic lift means a cradle to engage the car truck interiorly of the wheels whereby the car may be lifted until the wheels are free of the siding rails, in said hydraulic lift a fluid pressure weight sensing means, a transducer for converting weight sensing fluid pressure to proportional electrical signal, and means for measuring said electrical signal as an index of car weight.

References Cited in the file of this patent

UNITED STATES PATENTS

| | | |
|---|---|---|
| 932,050 | McFarlane | Aug. 24, 1909 |
| 1,821,661 | Miller | Sept. 1, 1931 |
| 2,047,038 | Smith | July 7, 1936 |
| 2,373,469 | Grime | Apr. 10, 1945 |
| 2,477,854 | Baker | Aug. 2, 1949 |
| 2,482,027 | Poole | Sept. 13, 1949 |
| 2,754,108 | Brown | July 10, 1956 |

FOREIGN PATENTS

| | | |
|---|---|---|
| 5,561 | Great Britain | Apr. 22, 1886 |
| 112,571 | Great Britain | Jan. 17, 1918 |